(12) United States Patent
Magaldi

(10) Patent No.: US 7,311,049 B2
(45) Date of Patent: Dec. 25, 2007

(54) AIR AND WATER CONVEYOR/COOLER FOR HOT LOOSE MATERIALS

(75) Inventor: Mario Magaldi, Salerno (IT)

(73) Assignee: Magaldi Ricerche E Brevetti S.r.L., Salerno (IT)

(*) Notice: Subject to any disclaimer, the term of this patent is extended or adjusted under 35 U.S.C. 154(b) by 154 days.

(21) Appl. No.: 10/510,421

(22) PCT Filed: Apr. 7, 2003

(86) PCT No.: PCT/EP03/01831

§ 371 (c)(1),
(2), (4) Date: May 17, 2005

(87) PCT Pub. No.: WO03/085323

PCT Pub. Date: Oct. 16, 2003

(65) Prior Publication Data

US 2006/0213404 A1  Sep. 28, 2006

(30) Foreign Application Priority Data

Apr. 9, 2002 (IT) .......................... MI2002A0744

(51) Int. Cl.
*F23J 1/02* (2006.01)
(52) U.S. Cl. ................ 110/171; 110/186; 110/165 R

(58) Field of Classification Search ........... 110/165 R, 110/170, 171, 101 CC, 101 CD, 185, 186, 110/188, 190
See application file for complete search history.

(56) References Cited

FOREIGN PATENT DOCUMENTS

| AT | EP 0972988 A1 * | 1/2000 |
|---|---|---|
| FR | 2731064 A1 * | 8/1996 |
| IT | EP 0931981 A2 * | 7/1999 |
| WO | WO97/00406 * | 1/1997 |

* cited by examiner

*Primary Examiner*—Kenneth Rinehart
(74) *Attorney, Agent, or Firm*—Olson & Cepuritis, Ltd.

(57) ABSTRACT

The present invention regards a conveyor/cooler for hot loose materials produced by boilers and various industrial processes, mainly comprising a sealed metal container (1) connected to a boiler (2) or to an incinerator from which, thanks to the gravitational effect, the material (3) that leaves the combustion chamber falls. Inside of said container (1) a metal conveyor belt (4) is placed whereon the hot loose material (3) to be cooled is placed. The cooling of the material (3) occurs through the feeding of an air flow picked up from the outside environment integrated with atomized water sprinkled on the hot material (3) through a system of injecting nozzles (5) installed inside of the metal container (1).

16 Claims, 5 Drawing Sheets

AIR AND WATER CONVEYOR/COOLER FOR HOT LOOSE MATERIALS

The present invention is about an air and water conveyor/cooler for hot loose materials such as either heavy ashes generated by boilers, or ashes and slags produced in the various industrial processes like burning, baking, etc.

The innovative features, the objects and the advantages of the present invention will be understood in a not limiting way from the following description and from the annexed drawings relative to some embodiments wherein the different figures show:

It must be clarified on this matter that the same reference numbers in the various figures indicate similar or matching parts.

Figure 1:
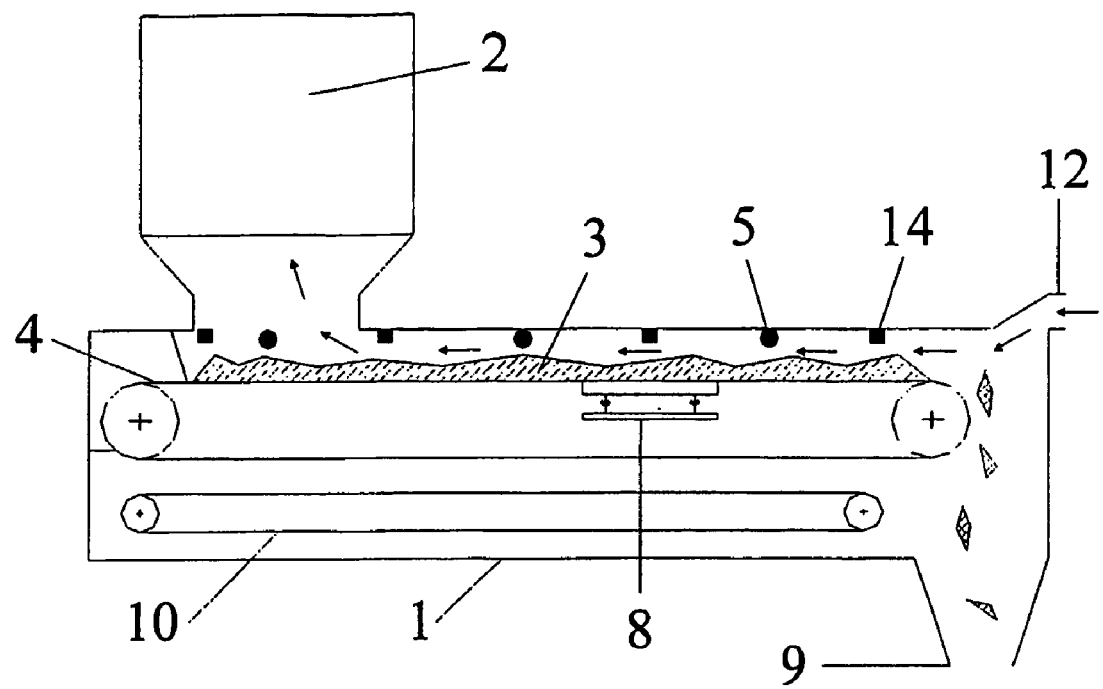
FIG. 1 is a lateral diagrammatic view of a conveying/cooling device according to the present invention for hot loose materials (3) coming from vacuum operated combustion chambers (2)
Figure 2:
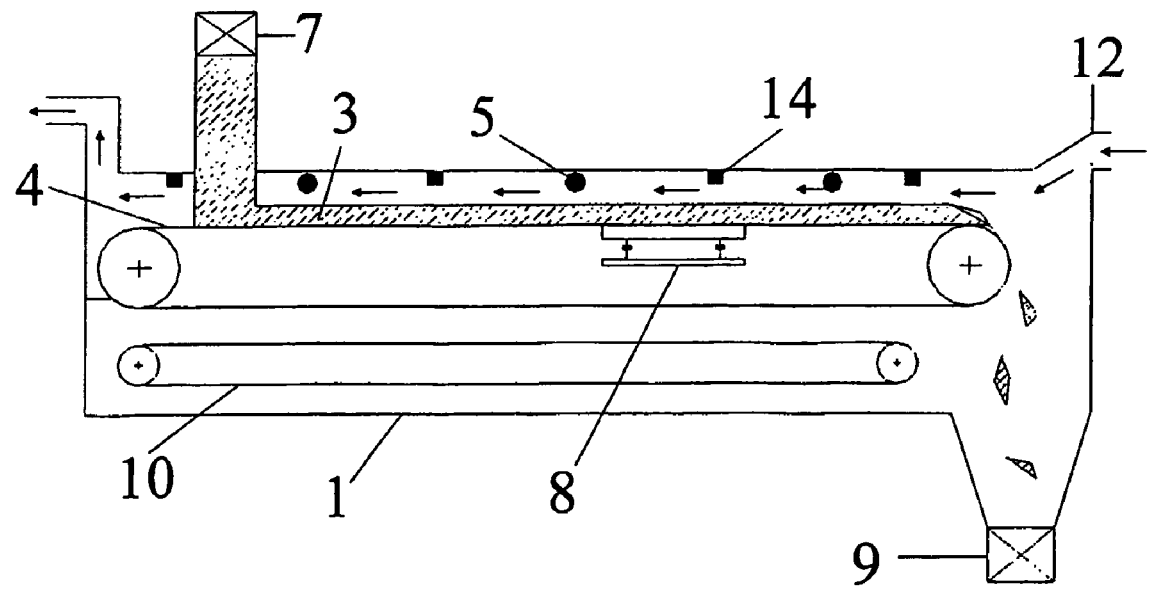
FIG. 2 is a lateral diagrammatic view of a conveying/cooling device according to the present invention for hot loose materials (3) coming from pressure operated combustion chambers (7)
Figure 3:
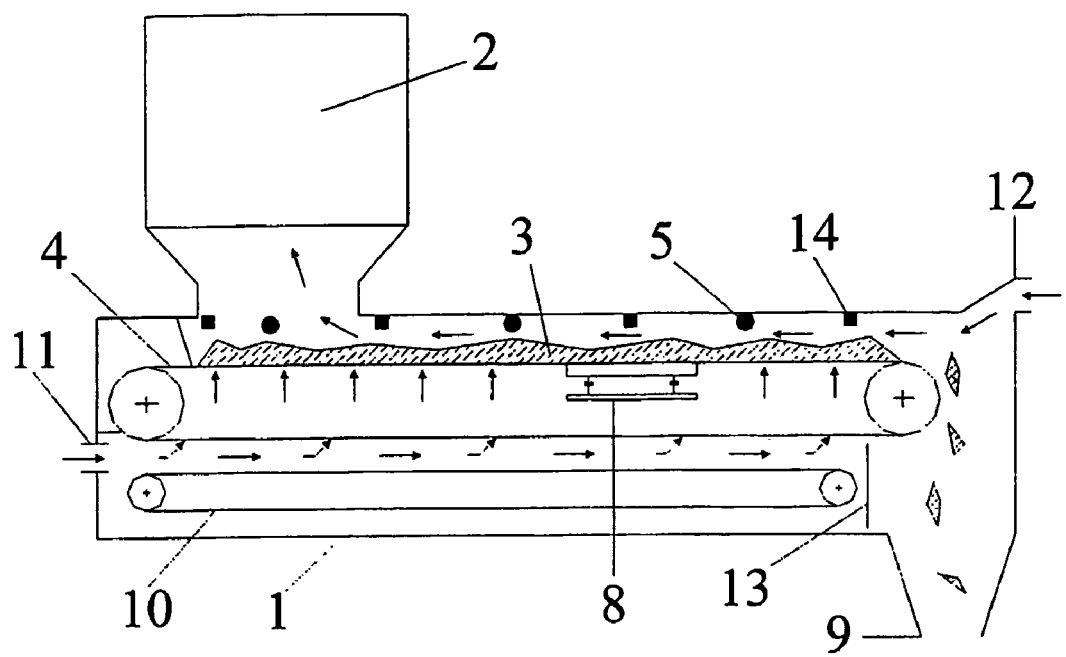
FIG. 3 is a lateral diagrammatic view of a conveying/cooling device according to the present invention having the belt equipped with slots.
Figure 4:
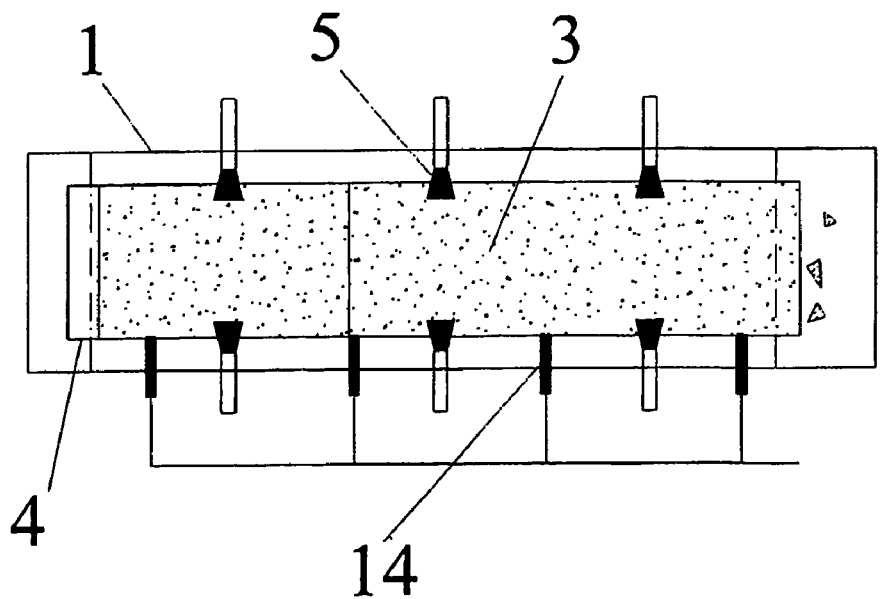
FIG. 4 is a plan diagrammatic view of a conveying/cooling device of hot loose materials (3) according to the present invention.
Figure 5:
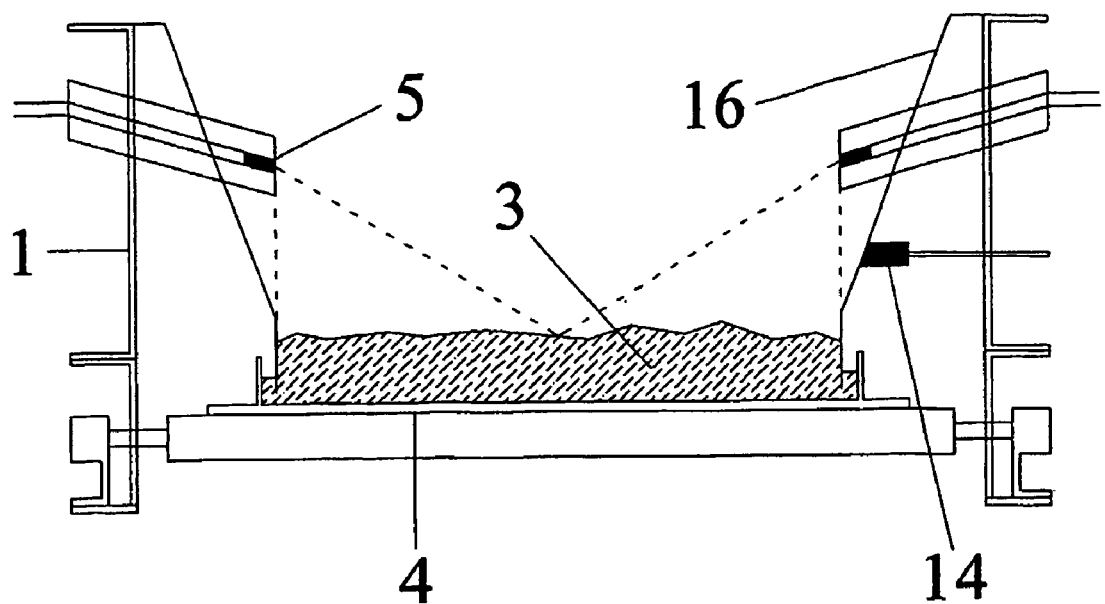
FIG. 5 is a diagrammatic view of the plano-volumetric arrangement of the nozzles (5) of the water sprinkling system in the small side panels (16) of the metal container (1)
Figure 6:
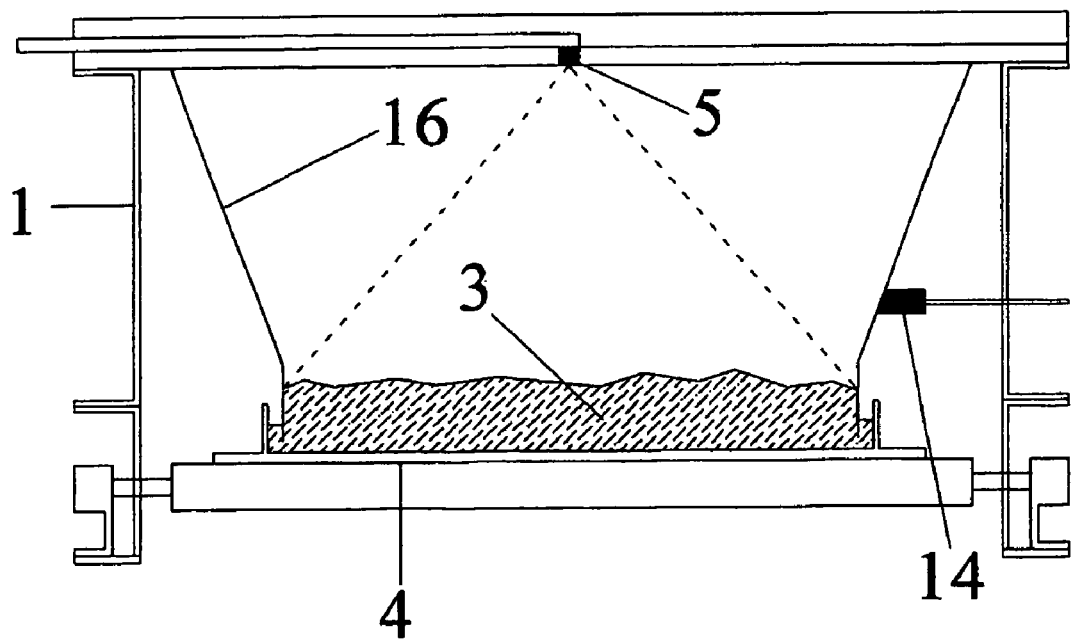
FIG. 6 is a diagrammatic view of the plano-volumetric arrangement of the nozzles (5) of the water sprinkling system in the upper cover of the metal container (1)
Figure 7:
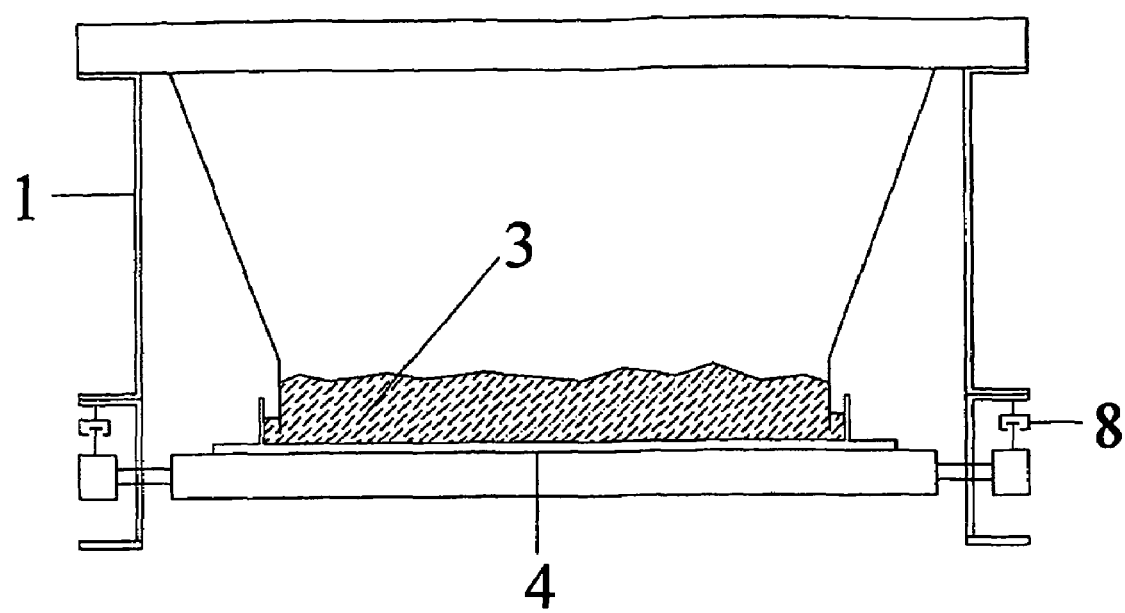
FIG. 7 is a diagrammatic view of the weighing system (8) installed on the conveyor belt (4) for the capacity control.
Figure 8:
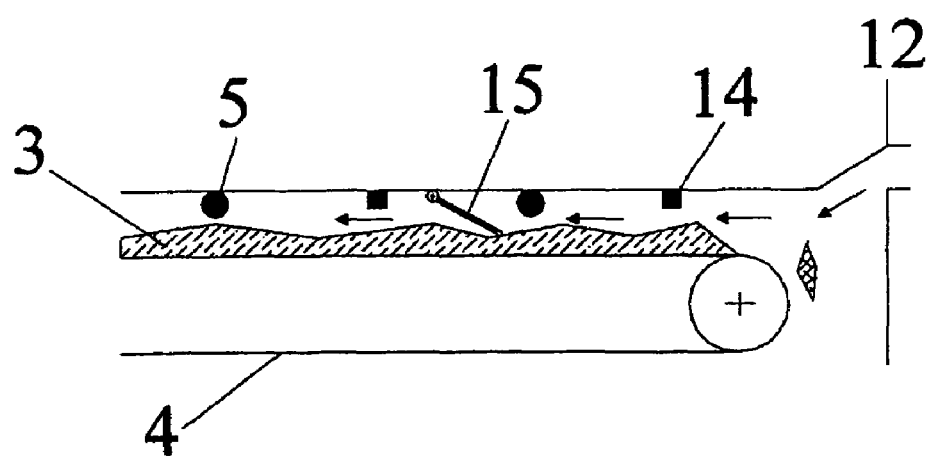
FIG. 8 is a diagrammatic detail of the strap iron (15) installed on the metal container (1) for the capacity control.
Figure 9:
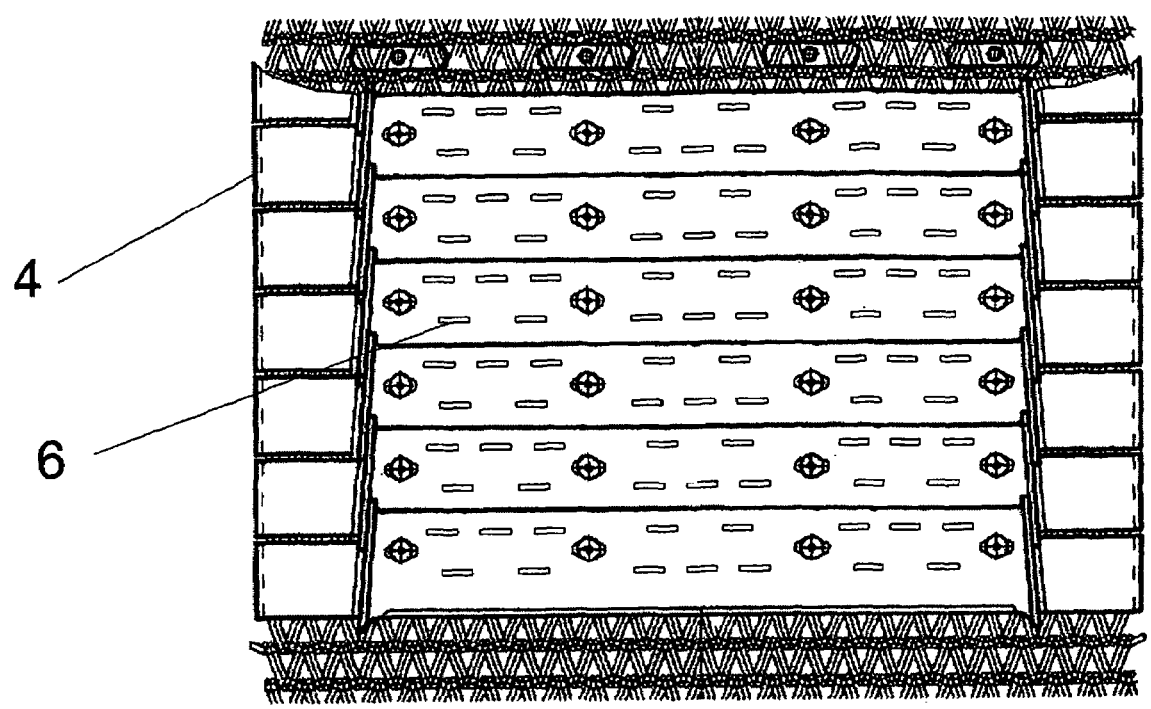
FIG. 9 is a diagrammatic view of the metal conveyor belt (4) having the plates equipped with slots (6).

The conveyor/cooler according to the present invention uses for the transport of the hot loose materials (3), specifically such as heavy ashes and other combustion byproducts coming from the boilers or incinerators (2-7), a driving means with a steel metal belt (4) inserted in a sealed metal container (1).

The hot loose material (3) thanks to the gravitational effect leaves the boiler or incinerator (2-7) under which the metal conveyor belt (4) is found, whereon the material (3) is laid down by forming a continuous bed traveling towards the unloading area (9).

The dusty material with a smaller grain size which falls from the metal belt (4) and is laid down on the bottom of the container (1) is conveyed towards the outlet (9) through the use of a scraping conveying means (10) with chains or with a metal net.

The speed of the conveyor belt (4) can be adjusted with respect to the capacity of the conveyed material (3) and of the specific cooling needs, so as to optimize the distribution of the ashes on the belt in order to increase the thermal exchange surface.

The cooling of the loose material (3) exiting from the combustion chambers at temperatures close to 800/900° C., takes place through the joint feeding of air flows and water jets atomized inside of the container (1).

The external air is took back in the metal container (1) through the air intakes by using the vacuum found in the combustion chamber when the conveying/cooling system is connected to vacuum operated boilers (2). In the event that the conveying/cooling system were to be installed downstream of the boilers or incinerators wherein the combustion occurs under pressure (7), the cooling air is induced inside of the metal container (1) with the aid of a forced ventilation system.

The air flow enters from the air intakes (12) and passes through the metal container (1) by heading against the stream with respect to the advancing of the hot material (3) conveyed by the metal belt (4) towards the unloading area (9).

In order to improve the efficiency of the cooling process, the metal plates of the conveyor belt (4) can be equipped with slots (6) through which the cooling air can reach the bottom of the traveling continuous bed and can flow inside the layer of the material (3). In such manner, in the metal container (1) additional air intakes (11) are provided, whose placement is such to generate a further cooling flow, different from the previous one.

Regarding the second air flow sucked by the intakes (11), a part of it flows at the bottom of the container (1) underneath the conveyor belt (4) towards the unloading area (9) where is mixed to the first flow coming from the air intakes (12), while the remaining part flows through the slots (6) made in the metal plates of the conveyor belt (4). By taking advantage of the difference in pressure existing between the upper section of the conveyor belt and the lower one, the air passes through the whole thickness of the traveling continuous bed of hot material (3), by cooling its bottom and the inner layer.

The geometry, the number and the arrangement of the slots (6) made in the plates of the conveyor belt (4) are defined as a function of the chemical-physical features of the conveyed material (3) and of the desired cooling degree, so as to avoid a possible leakage.

The fraction of used air for the two cooling portions of the incoming flow from the intake valves (11) can be measured through an adjustment mechanism (13) placed in the lower part of the metal container (1) in proximity of the unloading area (9).

The capacity of the cooling air is a function of the air intakes (11-12) and of the pressure difference established in the metal container (1), and it can be measured out by acting on the adjustment members of the intake valves.

The air absorbs the heat that the hot material (3) gives up thanks to the convective thermal exchange that the air directly has with the same material, with the walls of the metal container (1) which are radiatively heated, with the metal belt (4), both in its forward run and its return run, and at last through the possible post-combustion of the unburnt matter found in the conveyed material (3). It is convenient to clarify that in the specific case the metal conveyor belt (4) operates as a regenerative heat exchanger, by absorbing the heat from the hot loose material (3) in the forward run and by giving it up to the cooling air during the return run.

When the conveyor/cooler is applied to the boilers or vacuum operated incinerators (2), the air thus heated is taken back in the combustion chamber where is mixed with the main combustion air, by recovering in such manner part of the thermal energy accumulated during the cooling phase of the hot material (3). When instead the system is applied to pressure operated combustion chambers (7) the air is directly ejected into the atmosphere, after an appropriate filtering for the recovery of the volatile substances.

In order to further reduce the temperature of the hot material (3) conveyed by the metal belt (4) the air cooling system is integrated with the water cooling system.

The water cooling system is made of a determined number of nozzles (5) which can be activated when the air only cooling capacity is not enough to guarantee the desired thermal reduction. The nozzles (5) are arranged in such manner that the atomized water jets would be directed on the upper part of the hot loose material (3) conveyed by the metal belt (4) during the forward run towards the unloading area (9).

The integration of the atomized water sprinkling system allows increasing the thermal exchange with the conveyed material (3), therefore it is possible to reduce the horizontal dimensions of the metal container (1) compared to the cooling carried out with air only.

The sprinkling system can also be used in the applications wherein the object is not just that of reducing the temperature of the conveyed material (3), but it is also that of achieving a preset moisturizing of the same material.

The number of nozzles (5) therein, their plano-volumetric arrangement inside of the metal container (1) and the kind of each single nozzle (5) are predefined according to the chemical-physical characteristics of the conveyed material (3), according to the capacity of the same material and according to the desired cooling degree.

The sprinkling system can be connected to the compressed air network so as to jointly atomize water and air with respect to the need to optimize the cooling by appropriately measuring out the capacity of the two elements.

The capacity of the nozzles (5), the intervention sequence and the duration of the activation are defined according to the temperature of the material (3) and according to the level of the capacity of the same material, through the on-line processing of the signals received by the temperature sensors (14) installed inside the metal container (1), and by the value of the capacity of the material (3).

The instant value of the capacity of the hot loose conveyed material (3) can be measured by either utilizing a weighing system (8) directly connected to the conveyor belt (4), or by using a strap iron (15) hinged to the upper cover of the metal container (1) suitable to detect the height of the layer of the conveyed material (3).

It is obvious that several modifications, adjustments, additions, variations and substitutions of the elements with others which are functionally equivalent can be made to the embodiments of the invention described in an explanatory but not limiting way without falling out of the scope of protection recited by the following claims.

The invention claimed is:

1. A conveyor/cooler of solid hot loose materials (3) generated by boilers and by various industrial processes, comprising a sealed metal container (1) connected to combustion chamber of a boiler or an incinerator (2, 7), and a metal conveyor belt (4) in the metal container (1) for receiving the hot loose material (3) from the combustion chamber by gravity and forming a traveling continuous bed of material cooled by the joint action of atomized water jets and air flows, and wherein nozzles (5) are provided in the metal container (1) and define an atomized water sprinkling system and are connected to a compressed air plant in order to jointly atomize water and air with respect to the need to optimize the cooling by appropriately measuring out the capacities of the water and air.

2. The conveyor/cooler according to claim 1, characterized in that the conveyor belt (4) includes a regenerative heat exchanger which absorbs the heat from the material (3) during travel toward an unloading area (9) and it gives it up to the air in the return run.

3. The conveyor/cooler according to claim 1, characterized in that the device is adapted for installation underneath the boilers or incinerators wherein the combustion occurs either under vacuum (2) or pressure (7) with respect to the outer atmosphere.

4. The conveyor/cooler according to claim 3, characterized in that the device allows the recovery of thermal energy taken from the hot material (3) when it operates under vacuum; said recovery takes place by introducing the heated air with the heat given up by the material (3) into the combustion chamber of the boiler (2) by thus mixing it to the main combustion air.

5. The conveyor/cooler according to claim 1, characterized in that the intake air capacity into the metal container (1) from air intake ports (11, 12) can be adjusted in order to optimize the cooling.

6. The conveyor/cooler according to claim 1, characterized in that a scraping conveyor (10) with chains or with a metal net is provided in order to scrape the material's dust from the bottom of the container (1), wherein is deposited and is conveyed towards an unloading area (9).

7. The conveyor/cooler according to claim 1, characterized in that the number of nozzles (5) therein, their plano-volumetric arrangement inside of the metal container (1) and the type of each single nozzle (5), are preset according to the chemical-physical characteristics of the conveyed material (3), according to the capacity of the same material and according to the desired cooling degree.

8. The conveyor/cooler according to claim 1, characterized in that the capacity of the nozzles (5), the intervention sequence and the duration of the activation are defined according to the temperature of the material (3) and according to the level of the capacity of the same material.

9. The conveyor/cooler according to claim 8, characterized in that inside the metal container (1) temperature sensors (14) are installed whose signals are used in order to adjust the operation of the atomized water sprinkling system.

10. The conveyor/cooler according to claim 7, characterized in that the spraying angle of the nozzles (5) covers the entire surface of the traveling bed formed by the hot material (3).

11. The conveyor/cooler according to claim 1, characterized in that the plates of the metal conveyor belt (4) are equipped with appropriate slots (6) that allow the passage of the cooling air flow through the whole layer of the continuous bed formed by the hot loose material (3) traveling on said metal belt (4).

12. The conveyor/cooler according to claim 11, characterized in that the geometry, the number and the arrangement of the slots (6) made in the plates of the metal conveyor belt (4) is defined as a function of the type, the amount and mainly with respect to the grain size of the conveyed material (3) so as to prevent this material from leaking and falling to the bottom of the metal container (1).

13. The conveyor/cooler according to claim 11, characterized in that the fraction of cooling air flow which runs through the slots (6) in the plates of the metal belt (4) is adjustable, with respect to the specific cooling needs and to the possible presence of unburnt matter.

14. A conveyor/cooler of solid hot loose materials (3) generated by boilers and by various industrial processes, comprising a sealed metal container (1) connected to combustion chamber of a boiler or an incinerator (2, 7), and a metal conveyor belt (4) in the metal container (1) for receiving the hot loose material (3) from the combustion chamber by gravity and forming a traveling continuous bed of material cooled by the joint action of atomized water jets and air flows, and equipped with a capacity control system for the hot loose material (3) conveyed by the metal belt (4) which allows determining reference values suitable to adjust the intensity of the water and air flows.

15. The conveyor/cooler according to claim 14, characterized in that the capacity control of the hot loose conveyed material (3) is carried out by using a weighing system (8) directly connected to the conveyor belt (4).

16. The conveyor/cooler according to claim 14, characterized in that the capacity control of the hot loose conveyed material (3) can be carried out by using a strap iron (15) hinged to the cover of the metal container (1).

* * * * *